United States Patent [19]

Dotan

[11] Patent Number: 5,174,656
[45] Date of Patent: Dec. 29, 1992

[54] TEMPERATURE MEASUREMENT SYSTEM

[76] Inventor: Simon Dotan, 47 Vradim St., Ramat Poleg, Netanya 42651, Israel

[21] Appl. No.: 723,928

[22] Filed: Jul. 1, 1991

[30] Foreign Application Priority Data

Jul. 3, 1990 [IL] Israel .................................. 94962

[51] Int. Cl.$^5$ .................... G01K 7/00; A61B 5/00
[52] U.S. Cl. ..................... 374/179; 128/736; 340/604; 374/142; 374/163
[58] Field of Search ............. 374/141, 142, 148, 163, 374/174, 179, 183; 128/736; 73/73; 340/604; 200/182, 185

[56] References Cited

U.S. PATENT DOCUMENTS

| | | | |
|---|---|---|---|
| 764,176 | 7/1904 | Bristol | 374/174 |
| 2,127,538 | 8/1938 | Seiger | 200/182 X |
| 3,333,476 | 8/1967 | Hardy et al. | 374/183 X |
| 3,570,312 | 3/1971 | Kreith | 374/183 |
| 3,947,692 | 3/1976 | Payne | 374/188 X |
| 4,265,117 | 5/1981 | Thoma et al. | 374/179 X |
| 4,279,154 | 7/1981 | Natamura | 374/179 X |
| 4,575,705 | 3/1986 | Gotcher | 374/183 X |
| 4,595,020 | 6/1986 | Palti | 374/179 X |
| 4,796,014 | 1/1989 | Chia | 304/604 X |
| 4,932,243 | 6/1990 | Suh et al. | 73/73 |

Primary Examiner—Thomas B. Will
Assistant Examiner—G. Bradley Bennett
Attorney, Agent, or Firm—McAulay Fisher Nissen Goldberg & Kiel

[57] ABSTRACT

A device for measuring the temperature of humans having a measuring device which is placed in contact with the skin and a triggering mechanism for activating the temperature measurement. The triggering mechanism is activated by a change in polarization impedance which is measured by a sensor. The sensor's impedance may vary as a result of contact with bodily fluids, such as urine or sweat. After the temperature measurement is made, the results may be transmitted, displayed, or stored in the memory of the device.

17 Claims, 2 Drawing Sheets

TEMPERATURE MEASUREMENT SYSTEM

FIELD OF THE INVENTION

The invention relates to an automatic system for the measurement of temperature. The system is of use for the temperature measurement of children, especially infants, and also of other patients. The measurement is actuated by an event such as urination of an infant, sudden considerable transpiration by a patient and the like. Actuation is by means of any event which brings about a change of impedance close to the location of the temperature and polarization impedance sensors.

BACKGROUND OF THE INVENTION

Nowadays, the temperature of a patient is measured by means of an analog or a digital device. With analog devices the temperature probe is introduced into the location of measurement, and with digital devices the probe is also located in a similar position, but the actual measurement is done by a pressure of a button on the device. In both cases the process of measurement is actuated at will by the person taking the measurement or by the patient.

The present invention relates to an automatically actuated device where the actuation is by a predetermined event.

SUMMARY OF THE INVENTION

The present invention relates to an automatic temperature measurement system, based on a change of polarization impedance (P.I.) by means of a suitable sensor, and the use of such P.I. change for actuating an actual measurement by a suitable temperature sensor, such as thermistor, thermocouple or the like. The temperature which is thus measured can be visually displayed, or can be stored in a memory for subsequent recall. It is also possible to define a certain temperature range, and if this is exceeded, the device actuates a warning signal. The system can also be actuated, if desired, at predetermined time intervals.

The zero-setting of the instrument is automatic by pressing a suitable button, and any deviation from this value of P.I. which exceeds a predetermined value, actuates the actual measurement. The system can be actuated automatically when an infant urinates. It can be actuated when a patient has strong perspiration; and the instrument records both the temperature as well as the exact time of the measurement. The instrument generally measures a number of times per day the temperature, and thus provides a good picture of the temperature variations as well as its maximum.

The instrument according to the invention is illustrated with reference to the schematic enclosed drawings, which are not according to scale, and in which.

Figure 1:
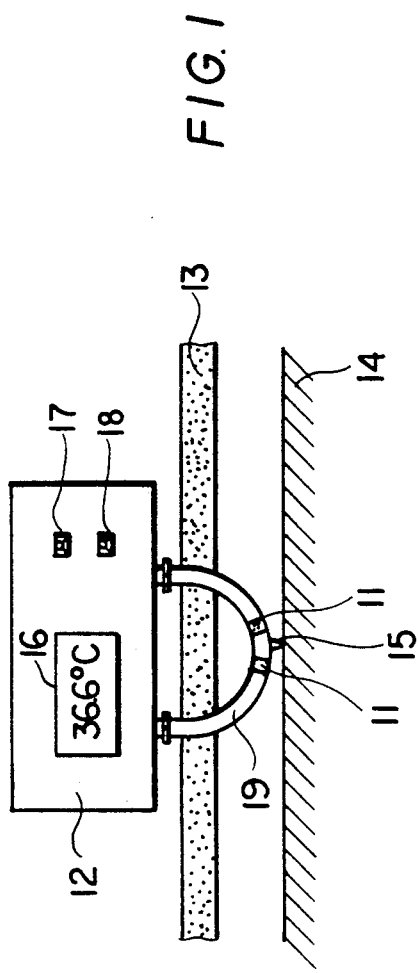
FIG. 1 is a side view, in partial section of the instrument.

As illustrated by FIG. 1, an instrument according to the invention comprises in combination a polarization impedance (P.I.) sensor 11, connected with the measurement device 12, where the leads pass through a layer 13 of clothing, a sheet or the like, which sensor is located close to the body 14 of the patient. There is provided a temperature sensor 15, adjacent the P.I. sensor 11. The instrument 12 comprises an LCD display of the temperature, 16, and is equipped with two buttons 17 and 18, for zeroing the reading and for actuating the measurement manually. The components of the instrument are set out in FIG. 2, and comprise the impedance sensor 11, the thermo-sensor 15, which P.I. sensor 11 is connected to amplifier 21, whereas the temperature sensor 15 is connected to amplifier 22. When the amplifier 21 outputs a signal to amplifier 22, this actuates a temperature measurement by means of sensor 15, the output of which is amplified by 22 and which passes via control unit 23 to the LCD display 24 and to memory 25.

The probe used is a Polarization Impedance probe (P.I.). Such a probe is generally comprised of an electrically insulating member, to which there are attached two electrically conducting members, separate from each other, which are connected by electrical leads to the other components of the system. A probe of this type used according to the present invention comprises a chemically inert non-conducting support 19, to which there are attached, in close proximity with each other, electrical conductors, such as ring-shaped members 11, made of a chemically resistant material, such as a suitable stainless steel or the like which will not corrode under the conditions of use of the device.

During measurement there is applied to the two conducting members a current at a small voltage, say of the order of about 1.0 to about 3.0 Volts, at a frequency in the range of about 5 KHz to about 40 KHz. Extensive experiments were carried out in this range, and good results were obtained at a frequency of about 30 KHz. The measurement is one of the current passing through the leads, which in turn is a function of the impedance between the two electrodes. When the P.I. probe comes into contact with sweat or urine, the impedance changes drastically, and an indication of such change is readily observed.

It is advantageous to use also a temperature probe, which is positioned in close proximity of the P.I. probe. Any suitable temperature sensor such as for example a thermistor, a bimetal, thermocouple or the like, can be used.

The P.I. probe and temperature sensor can be positioned on a separate part of the system, connected with leads to the other part of the system, or they can be located on one surface of the device, the readout and controls being located at its other side.

It is of advantage to have a separate probe which supports both the P.I. probe and the temperature sensor, which can be placed close to the body of the person, and to have the readout and other parts connected therewith by means of a flexible lead.

The device of the invention can be provided with means for indicating either a minimum or a maximum temperature, or both; it can also be provided with means for indicating a change of impedance above a certain predetermined threshold.

According to a further embodiment of the invention, the device can be provided with means for transmitting the measured data to a monitor positioned at a certain distance from the device, either via a cable link or by radio transmission.

Figure 2:
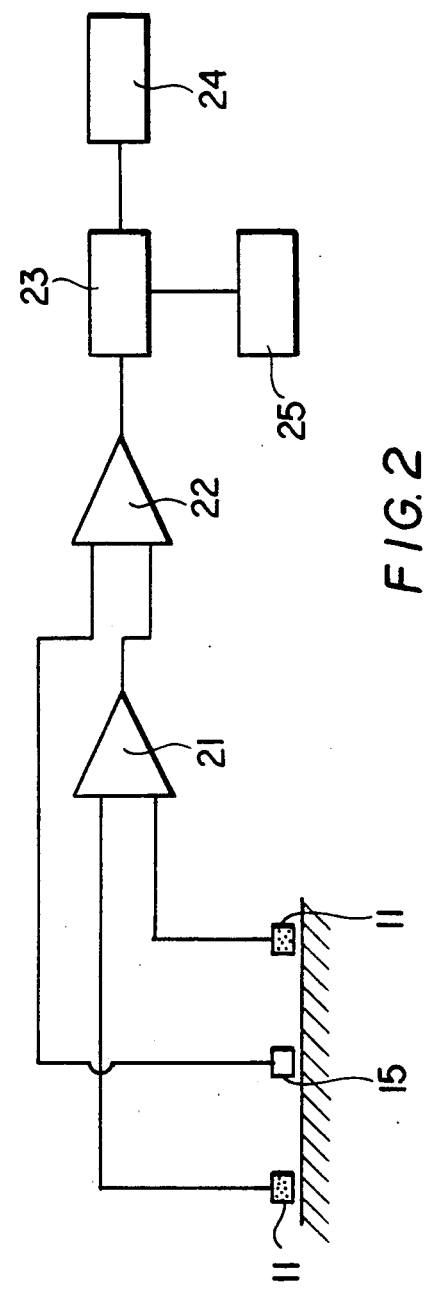
FIG. 2 is a block diagram of the system of the invention.
Figure 3:
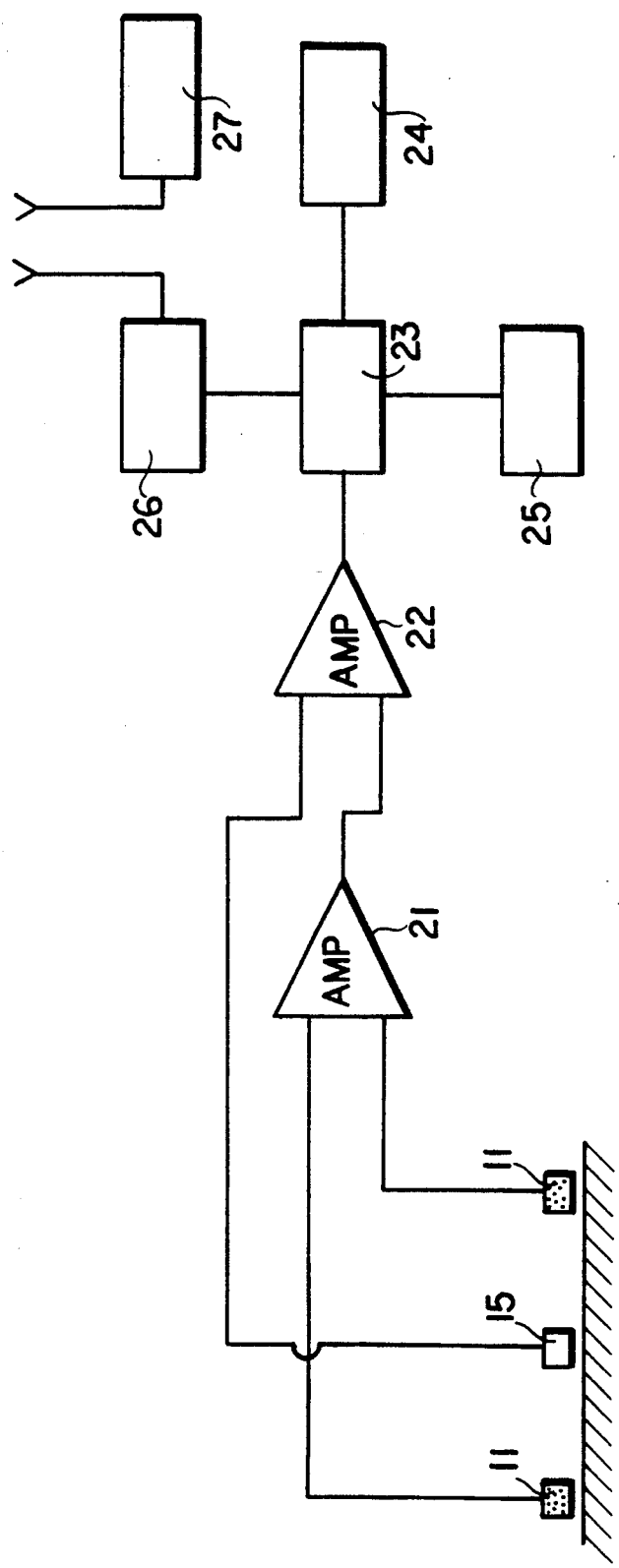
FIG. 3 is a block diagram of another version of the system.

Such a modified device is illustrated with reference to FIG. 3, where components identical with those of FIG. 2 are identified by the same numbers. This device comprises in combination the polarization impedance sensor 11, the thermo-sensor 15, connected respectively with amplifiers 21 and 22, which serve as input to controller 23, which in turn is connected with memory means 25, and also with the transmitter 26, which broadcasts the data to receiver 27. When the controller 23 receives a signal indicating a pronounced change of the polarization impedance measured by the P.I. sensor 11, temperature measurement by the thermo-sensor 15 is actuated, and the measured data are amplified and displayed on the LCD 24, while at the same time such data are transmitted by transmitter 26 to remote receiver 27 where such data can be displayed or recorded.

I claim:

1. A system for measuring and indicating temperature comprising:
   (a) a temperature measurement device;
   (b) temperature measurement activating means which activates said temperature measurement device when measured polarization impedance varies from a temperature measurement triggering value comprising:
      (1) polarization impedance measurement means; and
      (2) a control unit which compares said measured polarization impedance to said temperature measurement triggering value; and
   (c) a temperature indicating device.

2. The system according to claim 1, wherein said polarization impedance measurement means comprises:
   (a) a polarization impedance sensor having first and second electrodes, said first electrode being electrically insulated from said second electrode;
   (b) means for applying a low voltage current to said first electrode which causes a return signal on said second electrode; and
   (c) means for amplifying said return signal.

3. The system according to claim 2, wherein said low voltage current has a frequency between 1 KHz and 40 KHz.

4. The system according to claim 2, wherein said first and second electrodes are closely spaced.

5. The system according to claim 1, wherein the temperature indicating device is a liquid crystal display (LCD).

6. The system according to claim 1, which further comprises a memory storage facility for storing temperature measurements.

7. The system according to claim 1, wherein said temperature measurement triggering value is a predetermined value.

8. The system according to claim 1, which further comprises a transmitter for transmitting the measured temperature to a remote receiver.

9. The system according to claim 1, which further comprises an alarm for indicating a temperature measurement which exceeds a predetermined temperature.

10. The system according to claim 1, wherein the temperature measuring device is a thermistor.

11. The system according to claim 2, wherein the temperature measuring device is a thermistor.

12. The system according to claim 3, wherein the temperature measuring device is a thermistor.

13. The system according to claim 4, wherein the temperature measuring device is a thermistor.

14. A system for measuring and indicating the temperature of humans comprising a polarization impedance probe supporting first and second sensors:
   (a) said first sensor being a detecting sensor for detecting a change of polarization impedance when contacted by a bodily fluid, said detecting sensor comprising two closely spaced and electrically insulated from each other electrodes;
   (b) said second sensor being a temperature sensor; and,
   (c) triggering means for triggering the temperature measurement when such a change of polarization impedance takes place upon contact with a bodily fluid.

15. The system according to claim 14, wherein the temperature sensor is a thermistor.

16. The system according to claim 14, comprising means for applying to the electrodes a low voltage current having a frequency between 1 KHz and 40 KHz, means for amplifying the signal resulting from the contact of a bodily fluid with the electrodes, and means for triggering the temperature measurement when the resulting signal exceeds a predetermined value.

17. The system according to claim 15, comprising means for applying to the electrodes a low voltage current having a frequency between 1 KHz and 40 KHz, means for amplifying the signal resulting from the contact of a bodily fluid with the electrodes, and means for triggering the temperature measurement when the resulting signal exceeds a predetermined value.

* * * * *